United States Patent
Sugiyama et al.

[19]

[11] Patent Number: 6,166,511

[45] Date of Patent: Dec. 26, 2000

[54] ENERGIZATION CONTROLLER FOR A PHASE COIL OF AN ELECTRIC MOTOR

[75] Inventors: Masanori Sugiyama; Chiaki Honma, both of Aichi-ken, Japan

[73] Assignee: Aisin Seiki Kabushiki Kaisha, Kariya, Japan

[21] Appl. No.: 09/320,508

[22] Filed: May 26, 1999

[30] Foreign Application Priority Data

May 26, 1998 [JP] Japan .................................. 10-144727

[51] Int. Cl.$^7$ ....................................................... H02P 5/05
[52] U.S. Cl. ........................... 318/701; 318/254; 318/439
[58] Field of Search .................................... 318/701, 254, 318/439

[56] References Cited

U.S. PATENT DOCUMENTS

| | | | |
|---|---|---|---|
| 5,585,703 | 12/1996 | Acquaviva ............................... | 318/439 |
| 5,600,218 | 2/1997 | Holling et al. ........................... | 318/439 |
| 5,796,226 | 8/1998 | Ookawa et al. ......................... | 318/254 |
| 5,847,524 | 12/1998 | Erdman et al. ......................... | 318/439 |
| 5,977,740 | 11/1999 | McCann ................................... | 318/701 |
| 5,995,710 | 11/1999 | Holling et al. ........................... | 388/811 |

*Primary Examiner*—Paul Ip
*Assistant Examiner*—Marlon T. Fletcher
*Attorney, Agent, or Firm*—Sughrue, Mion, Zinn, Macpeak & Seas, PLLC

[57] ABSTRACT

A first comparison circuit compares the energization on angle outputted from a computer with the energization off angle outputted therefrom so as to output a first binary signal representing whether the latter is greater than the former. A second comparison circuit compares the energization on angle outputted from the computer with the rotation angle of the rotor outputted from the angle sensor so as to output a second binary signal representing whether the latter is greater than the former. A third comparison circuit compares the energization off angle outputted from the computer with the rotation angle of the rotor outputted from the angle sensor so as to output a third binary signal representing whether the latter is smaller than the former. A binary signal process circuit processes the first, second and third binary signals outputted from the first, second and third comparison means so as to output a fourth binary signal representing energization on and off.

3 Claims, 8 Drawing Sheets

ENERGIZATION CONTROLLER FOR A PHASE COIL OF AN ELECTRIC MOTOR

FIELD OF THE INVENTION

The invention relates to an energisation controller for a phase coil of an electric motor, e.g. a switched reluctance motor, wherein the energisation controller is used for each of a plurality of phase coils of a stator of the motor.

DESCRIPTION OF THE RELATED ART

The inventors of the present invention had previously developed an energisation controller for each phase coil of plural phase coils of a stator of a switched reluctance motor (SR motor). This controller is neither published nor well known. The energisation controller comprises an angle sensor detecting a rotation angle of a rotor of the 5F, motor, a micro computer reading a pair of energisation on and off angles corresponding to a rotation speed and a torque of the SR motor from a memory storing plural pairs of energisation on and off angles corresponding to the various rotation speeds and torque, the micro computer outputting one of the energisation on and off angles as a practical energisation on angle and the other of the energisation on and off angles as a practical energisation off angle in accordance with decision results of magnitudes of the energisation on and off angles and a rotation direction of the SR motor, a first comparison circuit comparing the practical energisation on angle outputted from the computer with the rotation angle of the rotor outputted from the angle sensor so as to output a first binary signal representing whether the latter is greater than the former, a second comparison circuit comparing the practical energisation off angle outputted from the computer with the rotation angle of the rotor outputted from the angle sensor so as to output a second binary signal representing whether the latter is smaller than the former, and a binary signal process means for processing the first and second binary signals outputted from the first and second comparison means so as to output a third binary signal representing energisation on and off. Namely, the rotation angle of the rotor detected by the angle sensor changes as shown in FIGS. 7 and 8 when the SR motor is driven in normal direction while the rotation angle changes as shown in FIGS. 9 and 10 when the SR motor is driven in counter normal direction. Plural pairs of the energisation on and off angles stored in the memory are decided on the assumption that the SR motor is driven in normal rotation direction. An energisation off angle is greater than an energisation on angle concerning a pair of the energisation on and off angles corresponding to a rotation speed and a torque, as shown in FIGS. 7 and 9, while another energisation on angle is greater than another energisation off angle concerning another pair of the energisation on and off angles corresponding to another rotation speed and another torque, as shown in FIGS. 8 and 10. Referring to FIG. 7, a coil is energised when the rotor angle is smaller than the energisation off angle and is reached at the energisation on angle while the coil is de-energised when the rotor angle is greater than the energisation on angle and is reached at the energisation off angle. Referring to FIG. 8, a coil is energised when the rotor angle is greater than the energisation off angle and is reached at the energisation on angle while the coil is deenergised when the rotor angle is smaller than the energisation on angle and is reached at the energisation off angle. Referring to FIG. 9, a coil is energised when the rotor angle is greater than the energisation on angle and is reached at the energisation off angle while the coil is deenergised when the rotor angle is smaller than the energisation off angle and is reached at the energisation on angle. Referring to FIG. 10, a coil is energised when the rotor angle is smaller than the energisation on angle and is reached at the energisation off angle while the coil is deenergised when the rotor angle is greater than the energisation off angle and is reached at the energisation on angle.

The energisation controller as described above processes the four kinds of energisation/deenergisation control as shown in FIGS. 7 through 10 by means of a micro computer with the plural pairs of the energisation on and off angles that are stored in the memory and decided on the assumption that the SR motor is driven in normal rotation direction. In fact, a pair of the practical energisation on and off angles is computed on the basis of a pair of energisation on and off angles outputted from the memory, so that this computation process takes some time. Therefore a maximum rotation speed is limited at a lower speed so as to prevent abnormal energisation.

SUMMARY OF THE INVENTION

Accordingly, an object of the invention is to provide an energisation controller by which maximum rotation speed is increased in comparison with the above energization controller without abnormal energisation in accordance with the invention. An energisation controller is provided for each of a plurality of phase coils of a stator of an electric motor. Each controller comprises an angle sensor detecting a rotation angle of a rotor of an electric motor, a micro computer reading a pair of energisation on and off angles corresponding to a rotation speed and a torque of the electric motor from a memory storing plural pairs of energisation on and off angles corresponding to the various rotation speeds and torque. A first comparison circuit is provided for comparing the energisation on angle outputted from the computer with the energisation off angle outputted therefrom so as to output a first binary signal representing whether the latter is greater than the former. A second comparison circuit is provide for comparing the energisation on angle outputted from the computer with the rotation angle of the rotor outputted from the angle sensor so as to output a second binary signal representing whether the latter is greater than the former. A third comparison circuit is provided for comparing the energisation off angle outputted from the computer with the rotation angle of the rotor outputted from the angle sensor so as to output a third binary signal representing whether the latter is smaller than the former. The first, second and third binary signals outputted from the first, second and third comparison circuits are processed so as to output a fourth binary signal representing energisation on and off.

DESCRIPTION OF PREFERRED EMBODIMENT

Figure 1:
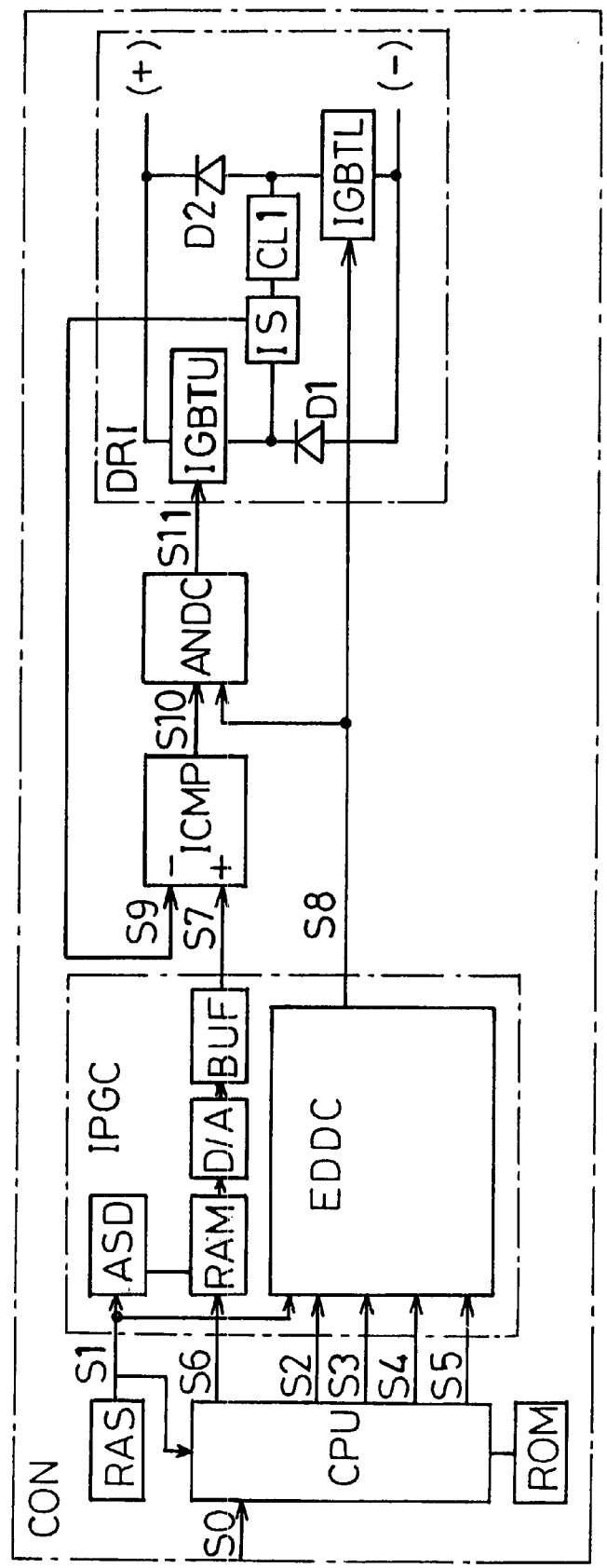
FIG. 1 is a block diagram of an energisation controller for a phase coil of an electric motor.

FIG. 1 shows an essential portion of an energisation controller of the preferred embodiment. A three phase switched reluctance motor (SR motor) is provided with first, second and third phase electrical coils and the energisation controller is used for the first phase electrical coil. The second and third phase coils are also controlled by a respective energisation controller that is the same in construction as the controller for the first phase coil. However, a micro computer, a memory storing plural pairs of energisation on and off angles and an angle sensor detecting a rotation angle of a rotor of the SR motor are commonly used for each energisation controller. The SR motor can be provided as a drive source for an electric vehicle.

The energisation controller CON for the first phase electrical coil CL1 mainly comprises the angle sensor RAS, the memory ROM, the micro computer CPU, a current waveform generation circuit IPGC, a comparison circuit ICMP, an output decision circuit ANDC and driver DR1. The angle sensor RAS detects a rotation angle of the rotor of SR motor and outputs the rotation angle as a digital signal S1 to the microcomputer CPU, to an address decoder ASD and an energisation/deenergisation decision circuit EDDC. The address decoder ASD and the circuit EDDC are included in the current waveform generation circuit IPGC. The memory ROM comprises plural pairs of energisation on and off angles and a plurality of current waveforms that are corresponding to various rotation speeds and torques. Each of the plural current waveforms corresponding to data representing a standard current value that should be supplied to the first phase electrical coil CL1 at a rotation angle of the rotor.

A main switch is turned on while the electric vehicle is driven. In response to the main switch being turned from off to on, the micro computer CPU outputs a reset pulse signal S2 and a binary signal S3 representing the presence of an abnormal status according to a decision thereof is sent to the energisation/de-energisation decision circuit EDDC in the current waveform generation circuit IPGC. A high level of the binary signal S3 represents an absence of the abnormal status and a low level of the signal S3 represents the presence of the abnormal status. When the decision indicates the absence of the abnormal status, the micro computer CPU sequentially calculates a target driving torque for the SR motor on the basis of information SO which is fed from a shift lever, a brake switch, an accelerator switch and an accelerator opening sensor, and sequentially calculates a rotation speed (rotation number) on the basis of the digital signal S1 fed from the angle sensor RAS. The micro computer CPU reads a pair of energisation on and off angles and a current waveform corresponding to the torque and the rotation speed calculated, from the memory ROM. The micro computer outputs the energisation on angle as a digital signal S4 and the energisation off angle as a digital signal S5 to the energisation/deenergisation decision circuit EDDC in the current waveform generation circuit IPGC and outputs the current waveform as a digital signal S6 to a memory RAM in the current waveform generation circuit IPGC. The micro computer CPU generates a pair of energisation on and off angles and a current waveform for the second phase electrical coil in such manner that a pair of energisation on and off angles and a current waveform for the first phase coil are shifted by a first predetermined shift angle. The micro computer CPU generates a pair of energisation on and off angles and a current waveform for the third phase electrical coil in such manner that a pair of energisation on and off angles and a current waveform for the first phase coil are shifted by a second predetermined shift angle. The first and second shift angles are decided on the basis of number of poles of the stator.

The current waveform as the digital signal S6 outputted from the micro computer and fed to the memory RAM in the current waveform generation circuit IPGC (namely the data representing a standard current value corresponding to a rotation angle of the rotor) is stored in an address, corresponding to the rotation angle of the rotor, of the memory RAM. The rotation angle of the rotor as the digital signal S1 outputted from the angle sensor RAS and fed to the address decoder ASD in the current waveform generation circuit IPGC is changed to an address of the memory RAM. Whenever a rotation angle, detected by the angle sensor RAS, of the rotor changes, the current waveform generation circuit IPGC reads a standard current value corresponding to a rotation angle of the rotor from the memory RAM, converts the digital signal to an analogue signal 57 by means of a digital/analogue converter D/A and outputs the analogue signal 57 to the comparison circuit ICMP via an output buffer BUF. The energisation/deenergisation decision circuit EDDC in the current waveform generation circuit IPGC generates a binary signal S8 representing an energisation/deenergisation of the first phase electrical coil CL1, on the basis of the digital signal S1 outputted from the angle sensor PAS and the digital signals S2 through S5 outputted from the micro computer CPU, so as to output the binary signal S8 to the output decision circuit ANDC and to a transistor IGBTL which is one of two transistors (gate insulated bipolar transistor) IGBTU, IGBTL included in the driver DR1 for the first phase electrical coil CL1. A high level of the binary signal SS represents an energisation of the coil CL1 and a low level of the signal S8 represents a deenergisation of the coil CL1.

The driver DR1 for the first phase coil CL1 comprises the transistors IGBTU and IGBTL and diodes D1 and D2. The transistor IGBTU is connected between one end of the coil CL1 and a high potential line of a direct current power supply while the transistor IGBTL is connected between the other end of the coil CL1 and a low potential line of the direct current power supply. The diode D1 is connected between the one end of the coil CL1 and the low potential line of the direct current power supply while the diode D2 is connected between the other end of the coil CL1 and the high potential line of the direct current power supply. A current sensor IS is connected in signal line joining the one end of the coil CL1 and the transistor IGBTU so as to detect an actual current flow through the coil CL1. The current sensor is outputs an analogue signal S9 representing the actual current flow to the comparison circuit ICMP. The comparison circuit ICMP compares the analogue signal S7 representing a standard current value, which should be supplied to the coil CL1 with the analogue, signal S9 representing an actual current value, which actually flows through the coil CL1, and outputs a binary signal S10 representing whether the actual current value flowing through the coil CL1 is smaller than the standard current value, to the output decision circuit ANDC. A high level of the binary signal S10 represents that the actual current value flowing through the coil CL1 is smaller than the standard current value while a low level of the signal S10 represents that the actual current value flowing through the coil CL1 is greater than the standard current value.

The output decision circuit ANDC comprises an AND gate function and processes the binary signals S8 and S10 so as to generate a binary signal S11. The circuit ANDC outputs the binary signal S11 to the transistor IGBTU of the driver DR1 for the first phase electrical coil, CL1. The transistor IGBTU is turned on when the binary signal S11 is at a high level while the transistor IGBTU is turned off when the binary signal S11 is at a low level. The transistor IGBTL is turned on when the binary signal S8 is at a high level while the transistor IGBTL is turned off when the binary signal S8 is at a low level. The transistors IGBTU and IGTBL are both turned off when the signal S8 is at a low level, so that no current flows through the coil CL1. When the binary signal S10 is at a high level, the binary signal S11 is at a high level. Therefore the transistors IGBTU and IGTBL are both turned on when the signals S8 and S10 are both at a high level, so that current flows through the coil CL1. When the binary signal S10 is at a low level, the binary signal S11 is also at a low level. Therefore the transistor IGBTL is turned on when the binary signal S8 is at a high level while transistor IGBTU is turned off when the binary signal S10 is at a low level, so that no current flows through the coil CL1. As above mentioned, the actual current value is approximated to the standard target value by means of an alternate repeat that the transistor IGBTU is turned on and off in accordance with a change of the level of the binary signal S10 while the binary signal S8 is at a high level (the transistor IGBTL is turned on).

The energisation/deenergisation decision circuit EDDC in the current waveform generating circuit IPGC is specifically explained with reference to FIG. 2. The circuit EDDC comprises a clock pulse signal generation circuit CK, three latches RCH1, RCH2 and RCH3, three comparison circuits CMP1, CMP2, and CMP3, four AND gates AND1, AND2, AND3 and AND4, two OR gates OR1 and OR2, two inverters INV1 and INV2 and flip-flop circuit FDC. The clock pulse signal generation circuit outputs a clock pulse of predetermined frequency (e.g., 16 M Hz). The latches RCH1, RCH2 and RCH3 latch the digital signals S1, S4 and S5 respectively in synchronism with the fall of the clock pulse signal outputted from the clock pulse signal generation circuit CK, and output the latched digital signals S1, 34 and SS respectively. The comparison circuit CMP1 outputs a binary signal S12 in accordance with a comparison between the latched digital signal S4 and the latched digital signal SF. The binary signal S12 represents whether the latched signal S5 is greater than the latched signal 34 and a high level of the signal S12 represents that the latched signal S5 is greater than the latched signal S4. The comparison circuit CMP2 outputs a binary signal S13 in accordance with a comparison between the latched digital signal S1 and the latched digital signal S4. The binary signal S13 represents whether the latched signal 31 is greater than the latched signal S4 and a high level of the signal S13 represents that the latched signal S1 is greater than the latched signal S4. The comparison circuit CMP3 outputs a binary signal S14 in accordance with a comparison between the latched digital signal S1 and the latched digital signal S5. The binary signal S14 represents whether the latched signal S1 is smaller 7 than the latched signal S5 and a high level of the signal S14 represents that the latched signal S1 is smaller than the latched signal S5.

The binary signal S13 is fed to one of two input terminals of the AND gate AND1 and to one of two input terminals of the OR gate OR1. The binary signal S14 is fed to the other one of the two input terminals of the AND gate AND1 and to the other one of the two input terminals of the OR gate OR1. The binary signal S12 is fed to one of two input terminals of the AND gate AND2 and to the inverter INV2. Output signal of the inverter INV2 is fed to one, of two input terminals of the AND gate AND3. A binary signal outputted from the AND gate AND1 is fed to the other one of the two input terminals of the AND gate AND2. A binary signal outputted from the OR gate OR1 is fed to the other one of the two input terminals of the AND gate AND3. Binary signals outputted from the AND gates AND2 and AND3 are fed to a pair of input terminals of the OR gate OR2. A binary signal outputted from the OR gate OR2 is fed to an input terminal D of the flip-flop circuit FDC. An output of the clock pulse signal generation circuit is inverted at the inverter INV1 and fed to a clock pulse input terminal C of the flip-flop circuit FDC. The reset pulse signal S2 outputted from the micro computer 13 is fed to a reset pulse input terminal CLR, of the flip-flop circuit FDC. The flip-flop circuit FDC outputs the binary signal fed to the input terminal D, from a output terminal Q in synchronize with the fall of the inverted clock pulse fed to the clock pulse signal input terminal C. A binary signal outputted from the flip-flop circuit FDC is fed to one of the two input terminals of the AND gate AND4. The binary signal S3 outputted from the micro computer CPU is fed to the other one of the two input terminals of the AND gate AND4. The AND gate AND4 outputs the binary signal S8. The reset pulse signal S2 is fed to the reset pulse input terminal CLR, so that an output of the output terminal Q of the flip-flop circuit FDC is at a low level when the main switch is turned from off to on when the electric vehicle is booted.

Figure 2:
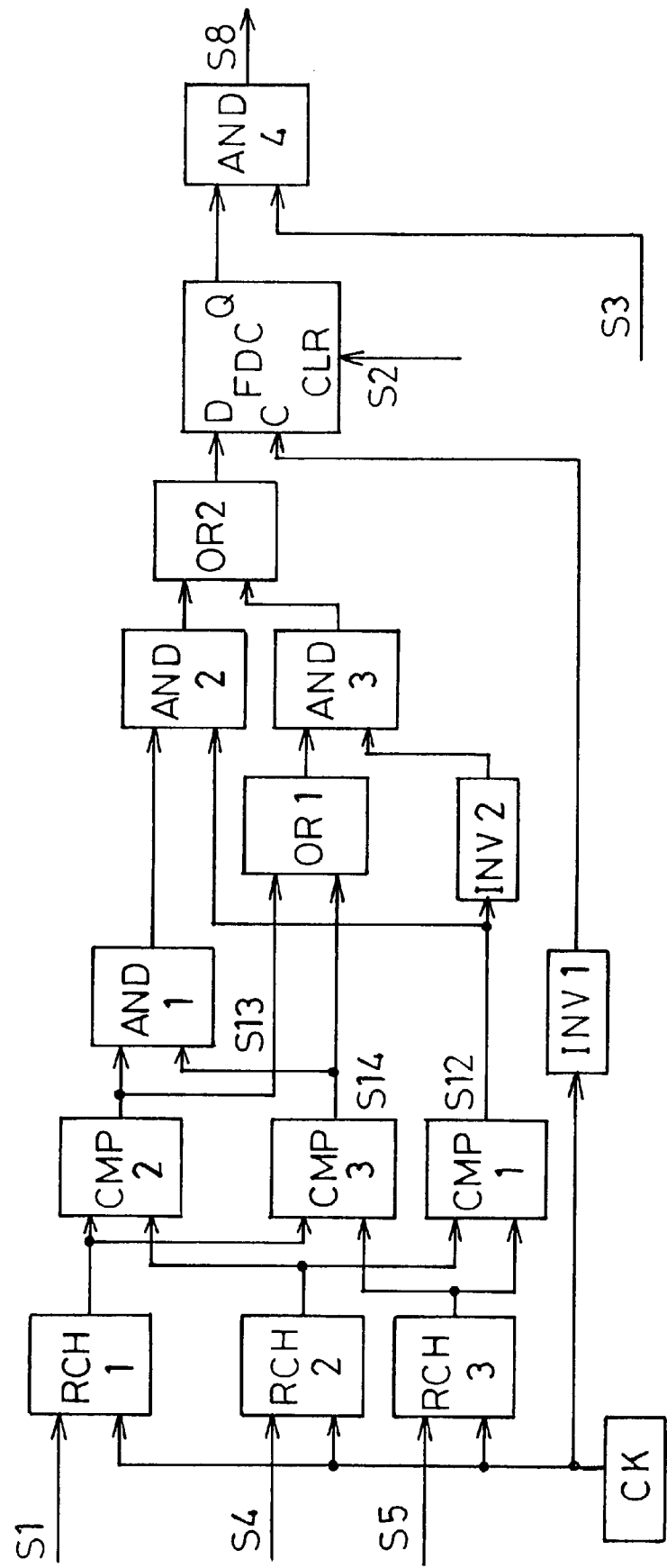
FIG. 2 is a diagram of an energisation/deenergisation decision circuit of FIG. 1.

Concerning the embodiment of FIG. 2, the AND gate AND4 provides a compulsory stop of the energisation of the coil CL1 when an abnormal status is detected. Therefore the binary signal S8, as the energisation on and off signals, outputted from the AND gate AND4, is fed to the output decision circuit ANDC and to the driver DR1 for the first phase electrical coil CL1. When it is intended that the energisation of the coil CL1 is not to be stopped in spite of the detection of the presence of the abnormal status, the AND gate AND4 is omitted and the binary signal, as the energisation on and off signals, outputted from the flip-flop circuit FDC is fed to the output decision circuit ANDC and to the driver DR1 for the first phase electrical coil CL1.

The comparison circuits CMP1, CMP2 and CMP3 correspond to first, second and third comparison means, respectively. A binary signal process means comprises the clock pulse signal generation circuit CK, the MD gates AND1, AND2 and AND3, the OR gates OR1 and OR2, the inverter INV1 and INV2 and the flip-flop circuit FDC.

Figure 3:
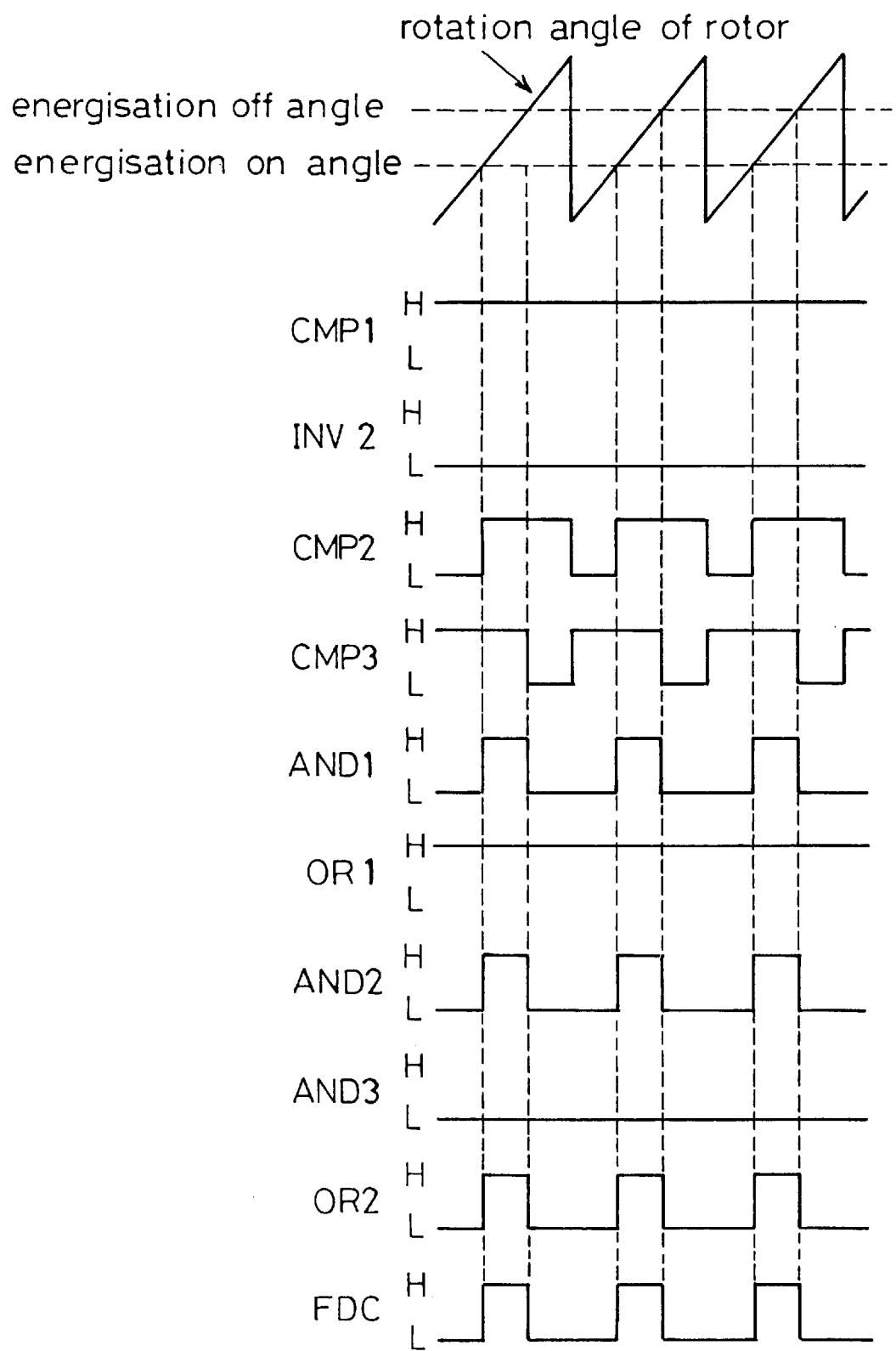
FIG. 3 is a time chart showing a function of the energisation/deenergisation decision circuit of FIG. 2.
Figure 4:
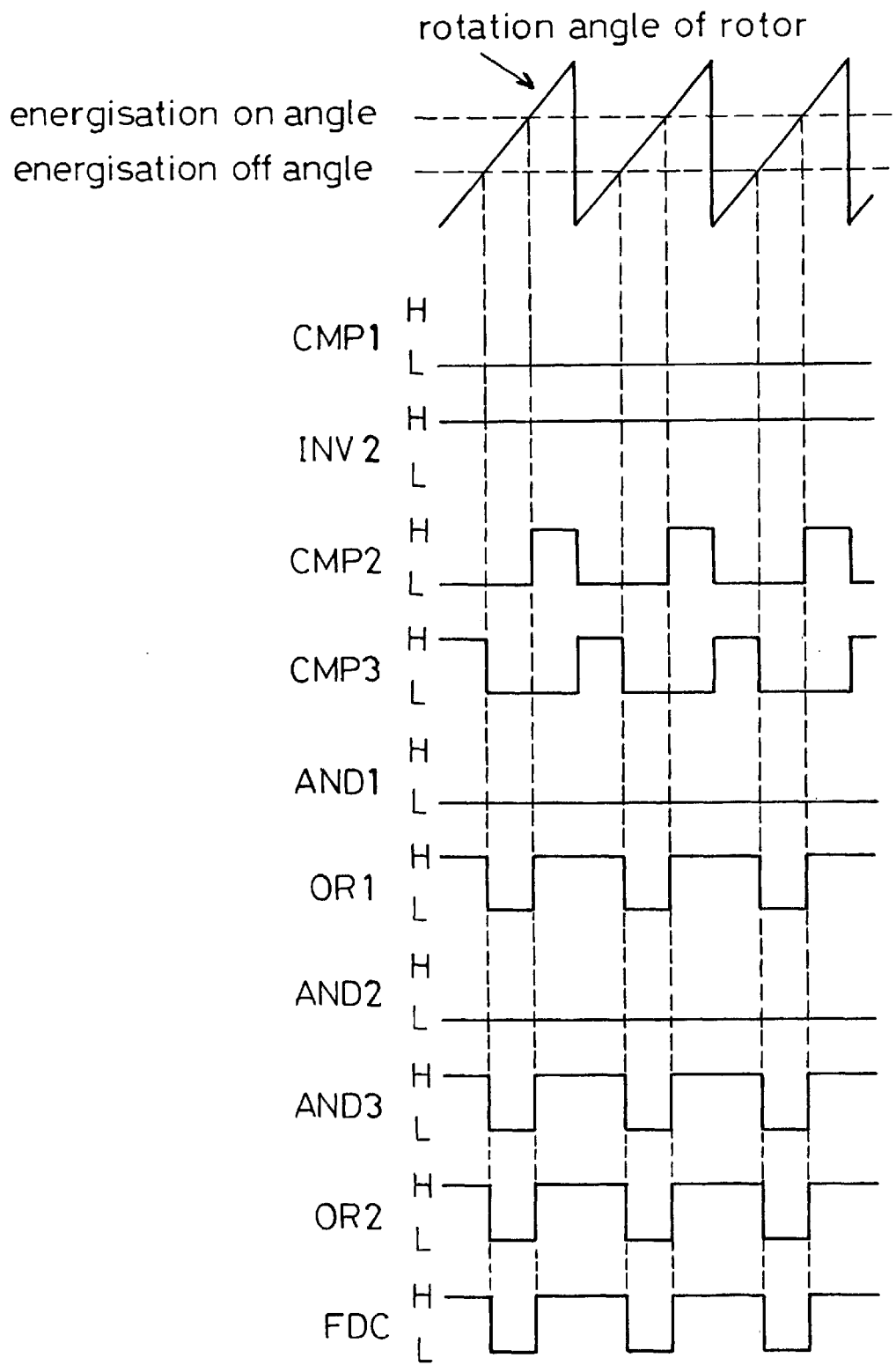
FIG. 4 is another time chart showing a function of the energisation/deenergisation decision circuit of FIG. 2.
Figure 5:
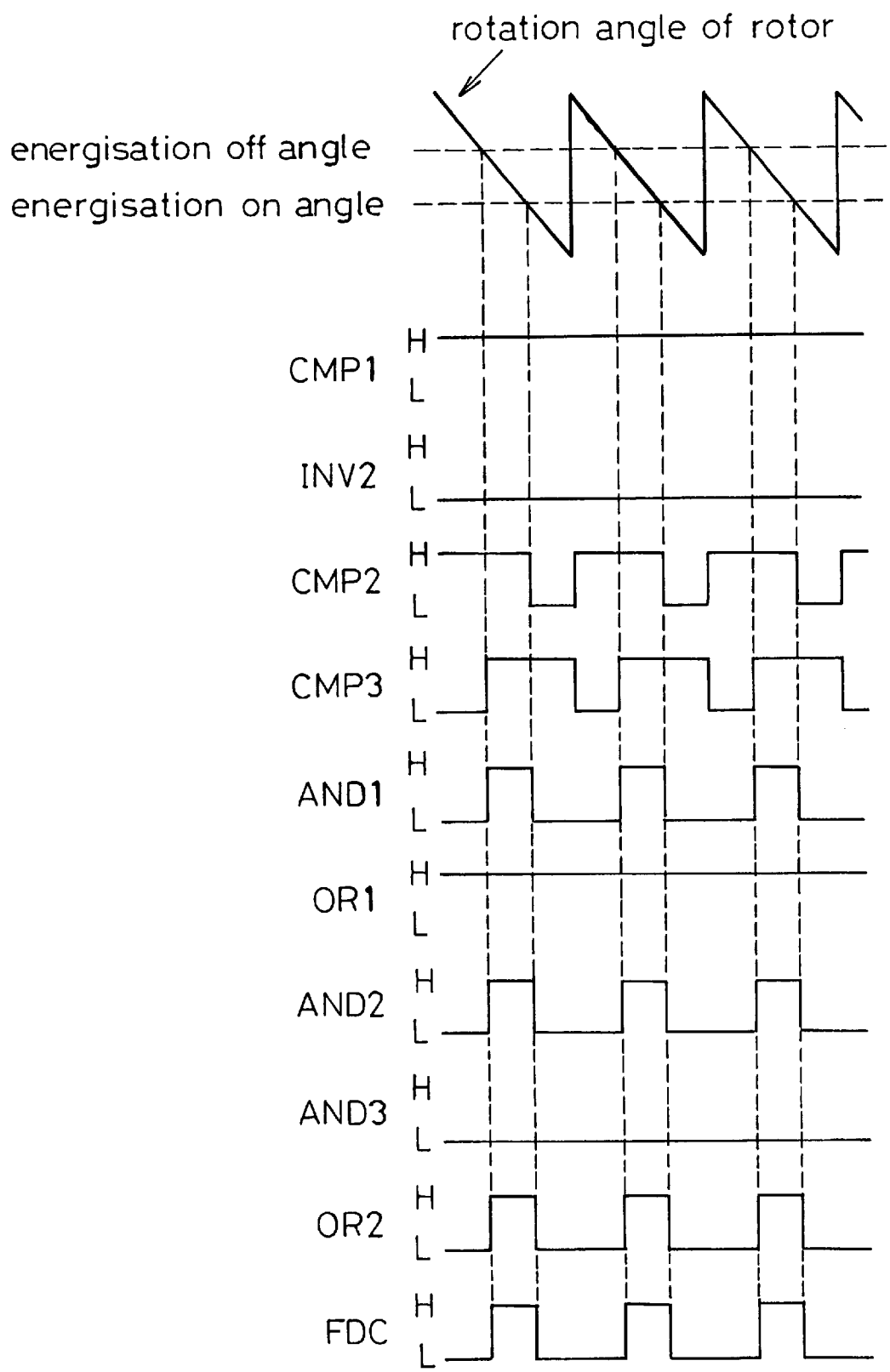
FIG. 5 is another time chart showing a function of the energisation/deenergisation decision circuit of FIG. 2.
Figure 6:
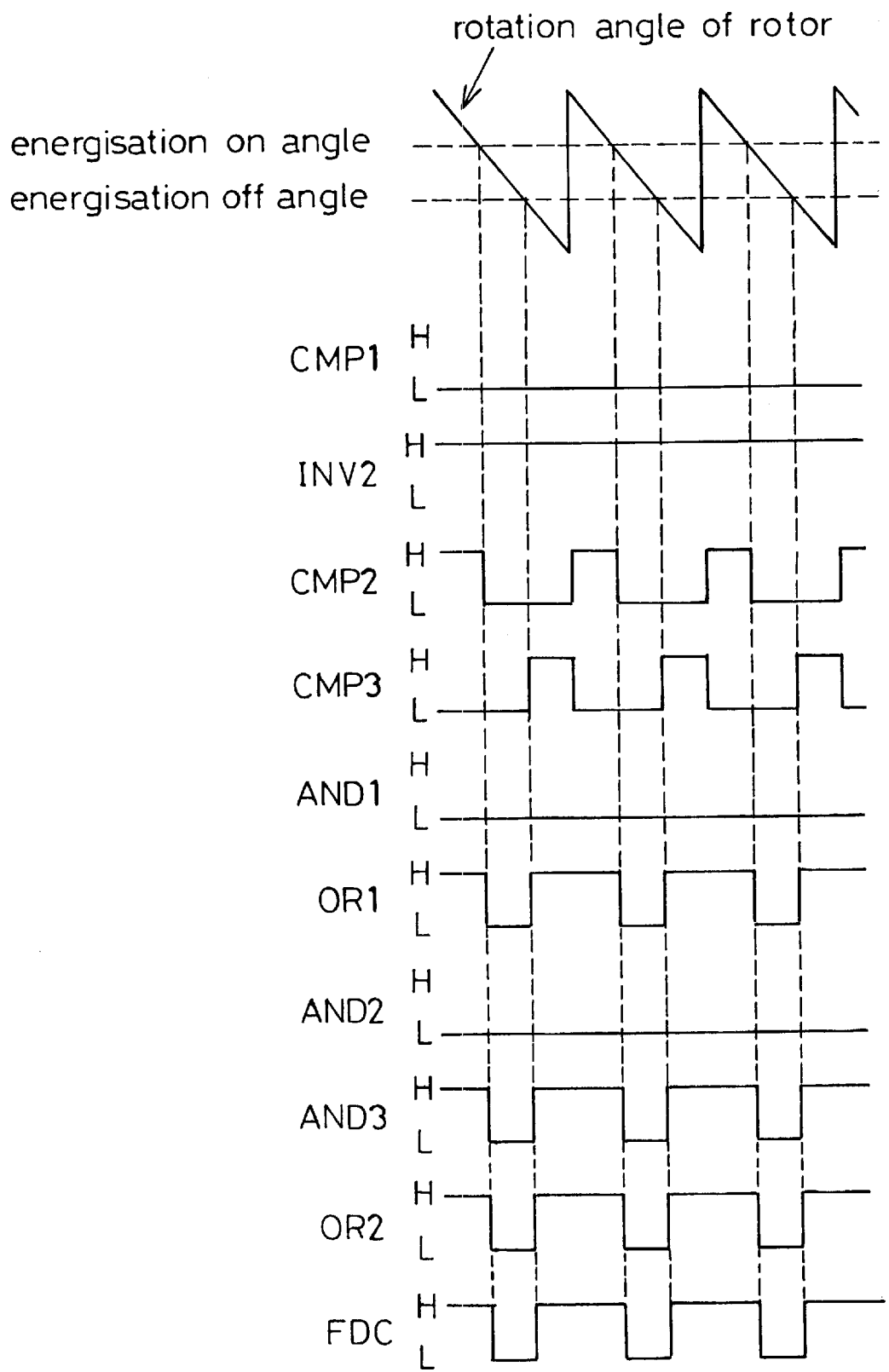
FIG. 6 is another time chart showing a function of the energisation/deenergisation decision circuit of FIG. 2.
Figure 7:
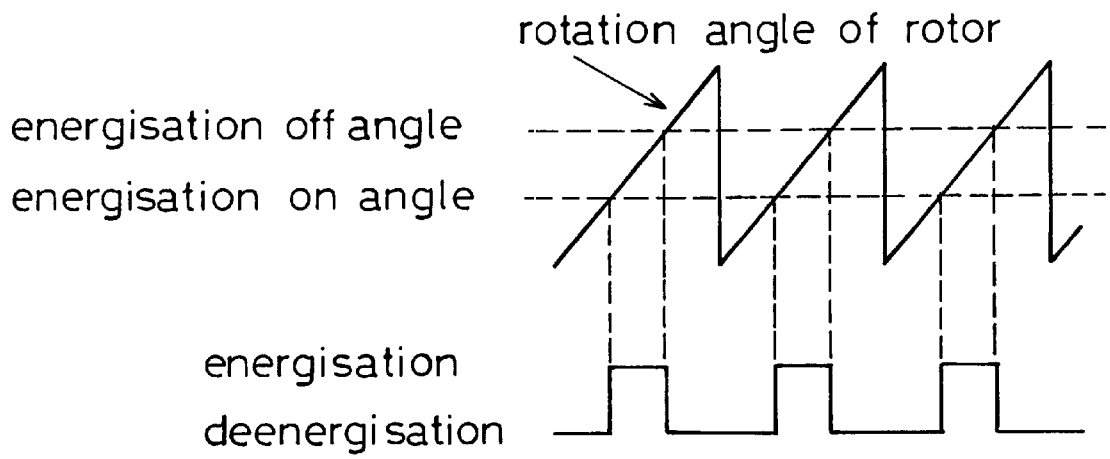
FIG. 7 is a time chart showing an energisation/ deenergisation control for the phase coil of the electric motor.
Figure 8:
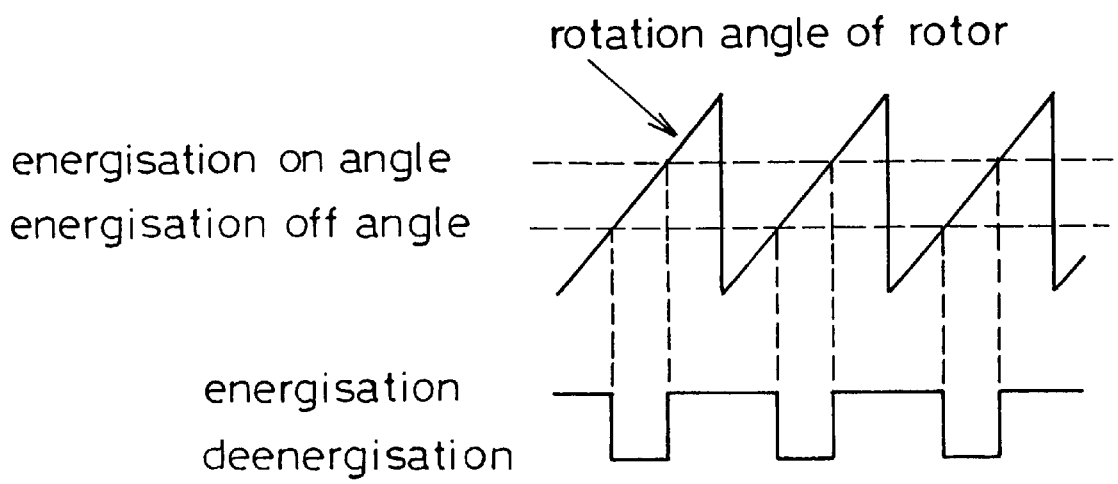
FIG. 8 is another time chart showing an energisation/deenergisation control for the phase coil of the electric motor.
Figure 9:
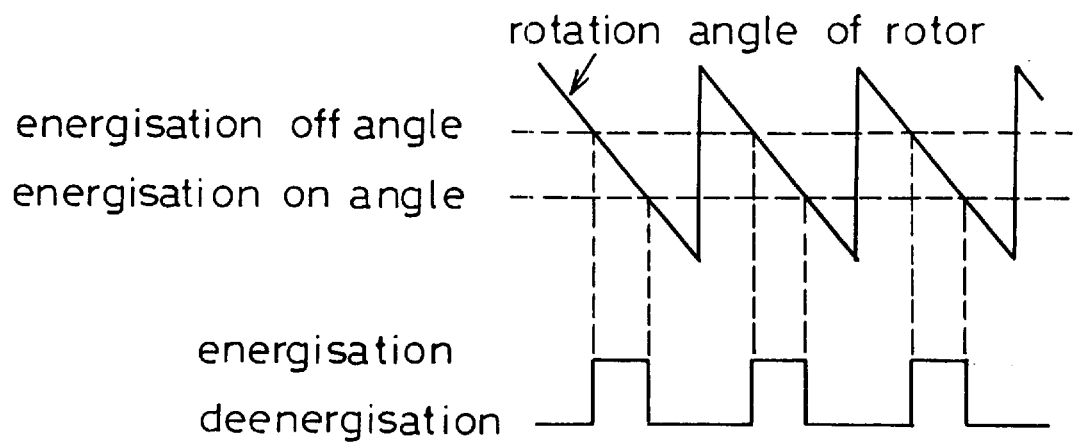
FIG. 9 is another time chart showing an energisation/de-energisation control for the phase coil of the electric motor.
Figure 10:
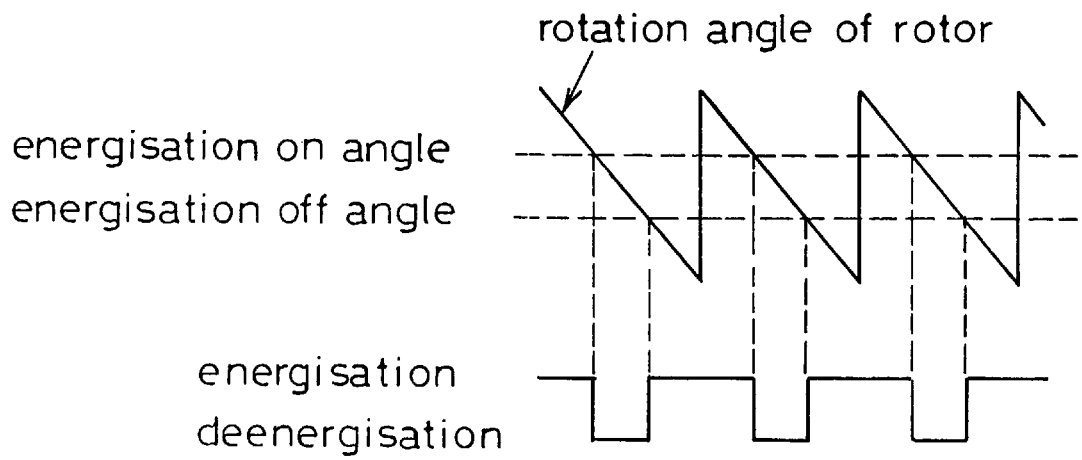
FIG. 10 is another time chart showing an energisation/de-energisation control for the phase coil of the electric motor.

FIG. 3 shows changes of output signals of the comparison circuits CMP1, CMP2 and CMP3, the AND gates AND1, AND2 and AND3, the OR gates OR1 and OR2, the inverters INV1 and INV2 and the flip-flop circuit FDC when the SR motor is driven in the normal rotation direction and the energisation on angle is smaller than the energisation off angle. FIG. 4 shows changes of output signals of the comparison circuits CMP1, CMP2 and CMP3, the AND gates AND1, AND2 and AND3, the OR gates OR1 and OR2, the inverters INV1 and INV2 and The flip-flop circuit FDC when the SR motor is driven in the normal rotation direction and the energisation on angle is greater than the energisation off angle. FIG. 5 shows changes of output signals of the comparison circuits CMP1, CMP2 and CMP3, the AND gates AND1, AND2 and AND3, the OR gates OR1 and OR2, the inverters INV1 and INV2 and the flip-flop circuit FDC when the SK motor is driven in the counter to normal rotation direction and the energisation on angle is smaller than the energisation off angle. FIG. 6 shows changes of output signals of the comparison circuits CMP1, CMP2 and CMP3, the AND gates AND1, AND2 and AND3, the OR gates OR1 and OR2, the inverters INV1 and INV2 and the flip-flop circuit FDC when the SR motor is driven in the counter to normal rotation direction and the energisation on angle is greater than the energisation off angle. In FIGS. 3 through 6, while the microcomputer outputs the binary signal at a high level, the output signal of the flip-flop circuit FDC coincides with the binary signal S8.

In FIGS. 2, 3 and 5, the output signal (signal S12) of the comparator CMP1 is always at a high level since the energisation off angle is greater than the energisation on angle. Because of the inverter INV2, the signal S12 at a low level is fed to the AND gate AND3. Namely, the AND gate AND3 always outputs a signal at a low level irrespective of the output signal of the OR gate OR1. The signal S12 at a high level is fed to the AND gate AND2 and the AND gate AND2 outputs a signal at a high level when the AND gate AND1 outputs a signal at a high level. The AND gate AND1 can output the signal at a high level when the signal S13 and S14 are both at a high level. The output signals of the AND gates AND2 and AND3 are fed to the OR gate OR2 and the AND gate AND2 actually controls the energisation of the coil CL1 when the energisation off angle is greater than the energisation on angle. In FIGS. 2, 4 and 6, the output signal (signal S12) of the comparator CMP1 is always at a low level since the energisation off angle is smaller than the energization on angle. The signal S12 at a low level is fed to the AND gate AND2. namely, the AND gate AND2 always outputs a signal at a low level irrespective of the output signal of the AND gate AND1. Because of the inverter INV2, the signal S12 at a high level is fed to the AND gate AND3 and the AND gate AND3 outputs a signal at a high level when the OR gate OR1 outputs a signal at a high level. The OR gate OR1 can output the signal at a high level when one of the signals S13 and S14 is at a high level. The output signals of the AND gates AND2 and AND3 are fed to the OR gate OR1 and the AND gate AND3 actually controls the energisation of the coil CL1, when the energisation off angle is smaller than the energisation on angle.

The micro computer CPU simply outputs a pair of energisation on and off angles read from the memory RAM to the energisation/deenergisation decision circuit EDDC of FIG. 2 so that desired energisation/deenergisation control shown in FIGS. 7 through 10 are executed. The micro computer does not decide magnitudes of the energisation on and off angles and a rotation direction of the SR motor. Therefore a maximum rotation speed 15 not limited at a lower speed and an abnormal energisation is prevented. This invention is applicable for other uses than with the SR motor.

While the preferred embodiments have been described, variation thereto will occur to those skilled in the art within the scope of the present inventive concepts which are delineated by the following claim.

What is claimed:

1. An energisation controller for each of plurality of phase coils of a stator of an electric motor comprising;

an angle sensor detecting a rotation angle of a rotor of the electric motor, a micro computer including means for reading a pair of energisation on and off angles corresponding to a rotation speed and a torque of the electric motor from a memory storing plural pairs of energisation on and off angles corresponding to the various rotation speeds and torque, a first comparison means for comparing the energisation on angle outputted from the computer with the energisation off angle outputted therefrom so as to output a first binary signal representing whether the latter is greater than the former, a second comparison means for comparing the energisation on angle outputted from the computer with the rotation angle of the rotor outputted from the angle sensor so as to output a second binary signal representing whether the latter is greater than the former, a third comparison means for comparing the energisation off angle outputted from the computer with the rotation angle of the rotor outputted from the angle sensor so as to output a third binary signal representing whether the latter is smaller than the former, and a binary signal process means for processing the first, second and third binary signals outputted from the first, second and third comparison means as to output a fourth binary signal representing energisation on and off, wherein when the first binary signal is at one of a binary level, the fourth binary signal represents the energisation on while both the second and third binary signal are at one of a binary level, and when the first binary signal is at the other of a binary level, the fourth binary signal represents the energisation on while one of the second and third binary signal is at the one of a binary level.

2. An energisation controller according to claim 1, wherein when the first binary signal is at a high level, the fourth binary signal represents the energisation on while both the second and third binary signals are at a high level, and when the first binary signal is at a low level, the fourth binary signal represents the energisation on while one of the second and third binary signals is at a high level.

3. An energisation controller according to claim 1, wherein the binary signal process means comprises a clock pulse signal generation circuit, first, second and third AND-gates, first and second OR-gates, first and second inverters and a flip-flop circuit having D, C and Q terminals, the first binary signal being inputted to the second inverter and the second AND gate, the second binary signal being inputted to the first AND gate and the first OR gate, the third binary signal being inputted to the first AND gate and the first OR gate, the output signal of the second inverter being inputted to the third AND gate, the output signal of the first AND gate being inputted to the second AND gate, the output signal of the first OR gate being inputted to the third AND gate, the output signal of the second AND gate being inputted to the second OR gate, the output signal of the third AND gate being inputted to the second OR gate, the output signal of the second OR gate being inputted to the terminal D of the flip-flop circuit, the output signal of the clock pulse signal generation circuit being inputted to the C terminal of the flip-flop circuit via the first inverter, and the Q terminal of the flip flop circuit outputting the output signal as the fourth binary signal.

* * * * *